June 19, 1951　　　　J. A. ERICKSON　　　　2,557,344
PORTABLE GRINDING MILL WITH DRAFT AND POWER INTAKE
MEANS FROM PRECEDING TRACTORS
Filed Dec. 22, 1948　　　　　　　　　　　3 Sheets-Sheet 1
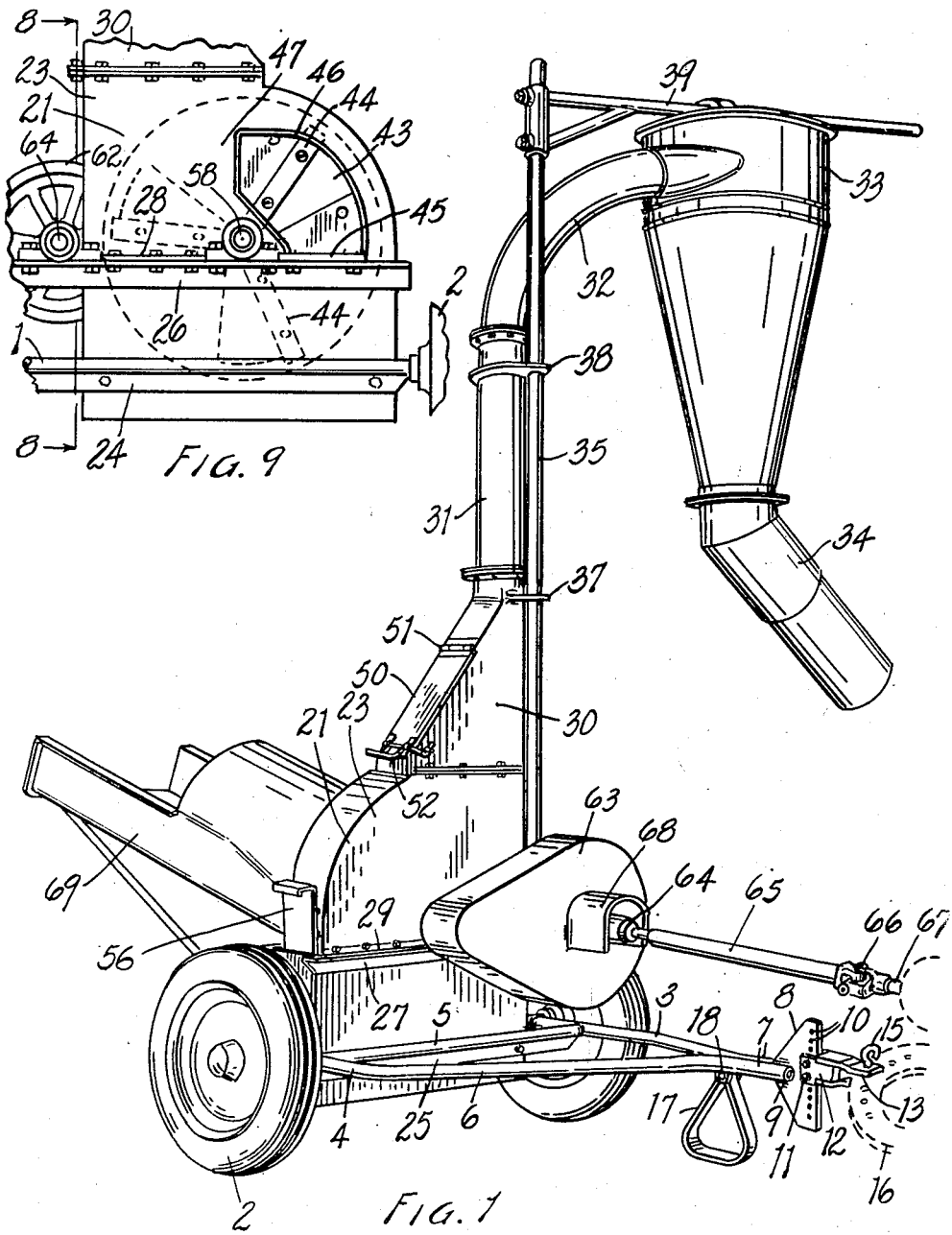
INVENTOR.
John A. Erickson
BY
Attorney

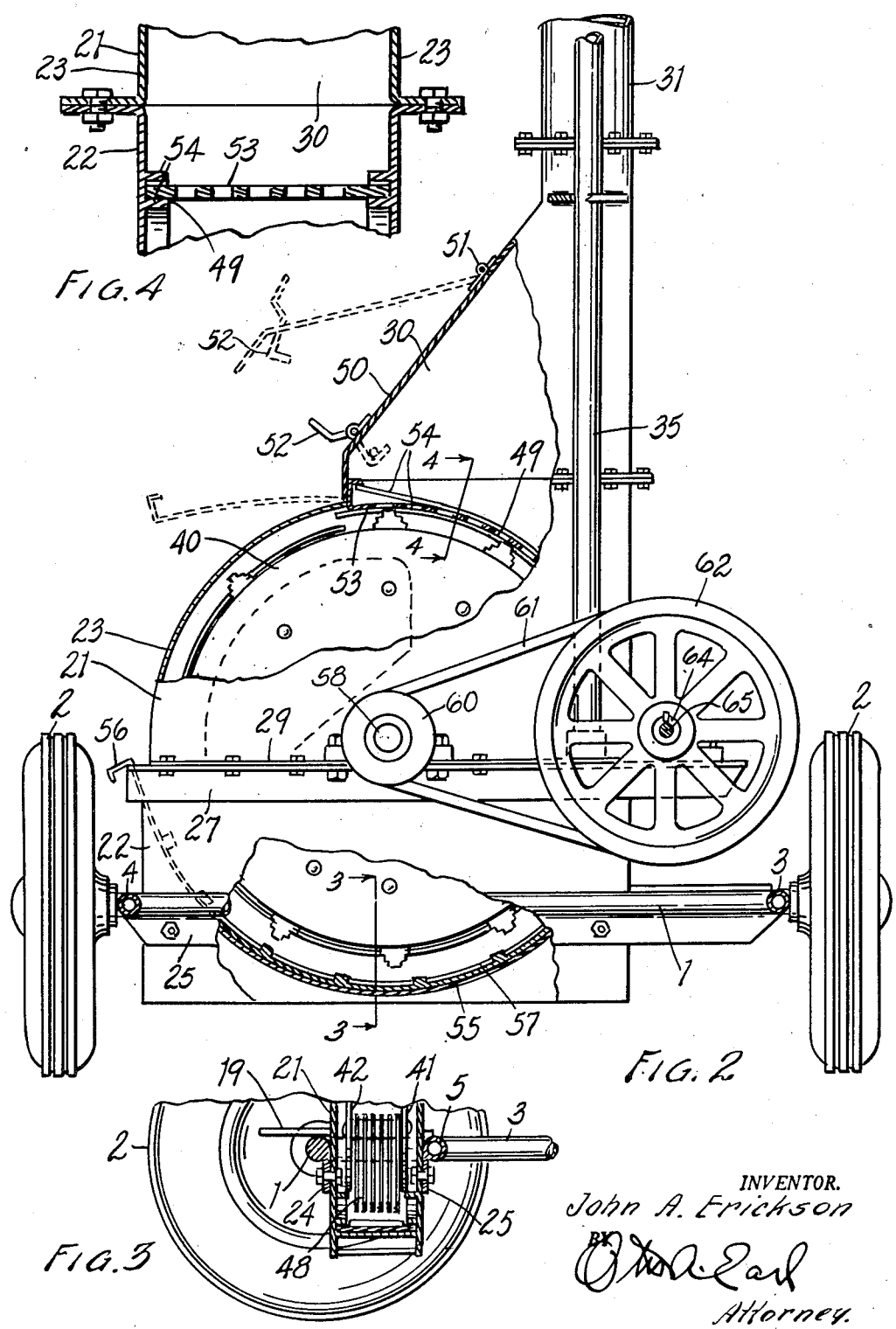

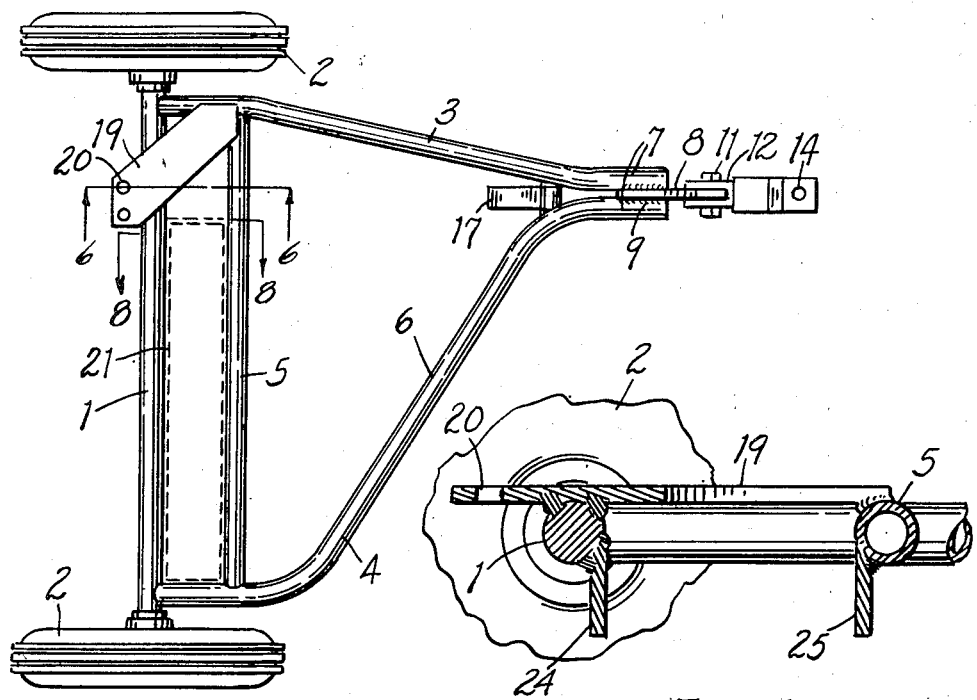
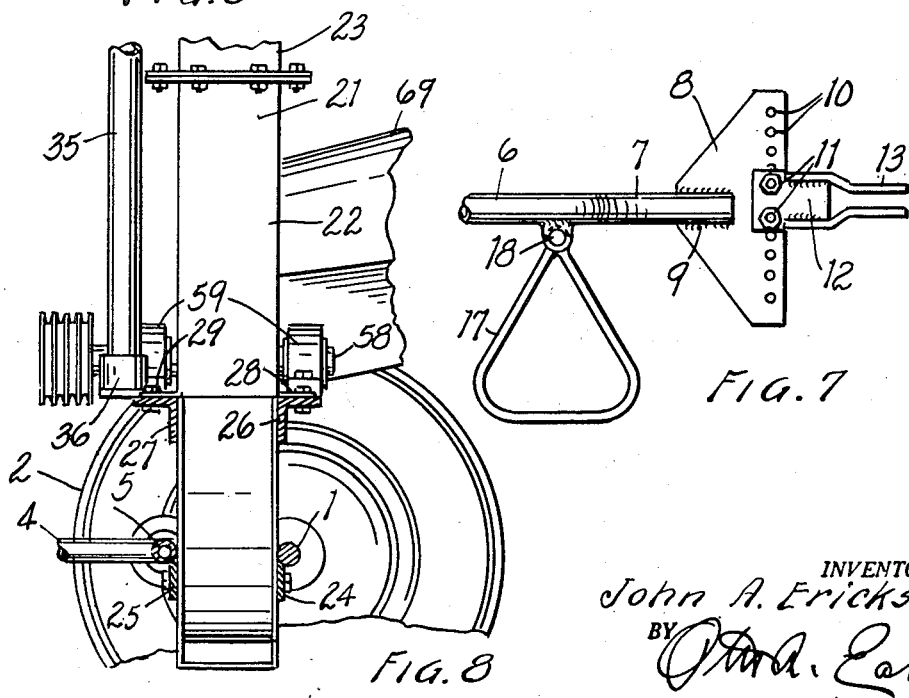

Patented June 19, 1951

2,557,344

UNITED STATES PATENT OFFICE 2,557,344

PORTABLE GRINDING MILL WITH DRAFT AND POWER INTAKE MEANS FROM A PRECEDING TRACTOR

John A. Erickson, Manhattan, Kans., assignor to Viking Manufacturing Company, Manhattan, Kans.

Application December 22, 1948, Serial No. 66,747

9 Claims. (Cl. 146—79)

This invention relates to improvements in portable grinding mills with draft and power intake means from a preceding tractor.

The main objects of this invention are:

First, to provide a portable grinding mill well adapted for use in fields and various other relations and to deliver the ground material to a truck or wagon box.

Second, to provide a portable grinding mill of light and simple construction which is stabilized and held in upright position for use by the tractor to which it may be hitched and is adapted to be driven from the power take-off of the tractor.

Third, to provide a portable mill with a removable discharge screen which may be quickly and easily changed thereby controlling to a considerable degree the fineness of the discharged material and adapting the mill to different materials.

Fourth, to provide a grinding mill of the character described in which the grinder serves as a blower for discharging the ground material.

Objects relating to details and economies of the invention will appear from the description to follow. The invention is pointed out in the claims.

A preferred embodiment of the invention is illustrated in the accompanying drawings, in which:

Fig. 1 is a front perspective view of a portable grinder embodying my invention.

Fig. 2 is a fragmentary view partially in front elevation and partially in vertical transverse section of a grinding mill embodying my invention, the manipulation of certain parts being shown by dotted lines.

Fig. 3 is a fragmentary view in section on a line corresponding to line 3—3 of Fig. 2.

Fig. 4 is an enlarged fragmentary view in section on a line corresponding to line 4—4 of Fig. 2 illustrating structural details.

Fig. 5 is a plan view of the carriage with the position of the grinder thereon indicated by dotted lines.

Fig. 6 is an enlarged fragmentary view on a line corresponding to line 6—6 of Fig. 5.

Fig. 7 is an enlarged fragmentary side elevational view showing the supporting leg in upright position.

Fig. 8 is an enlarged fragmentary view on a line corresponding to line 8—8 of Figs. 5 and 9 further showing details of the grinder proper to the supporting carriage.

Fig. 9 is a fragmentary rear elevational view with the feed table omitted showing further details of the grinder.

The embodiment of my invention illustrated comprises a carriage which includes the axle 1 provided with carrying wheels 2—2. The side members 3 and 4 are desirably formed of tubular stock and are connected adjacent the axle by means of the cross piece 5 which extends between the side members and is fixedly secured thereto. The side member 3 is inclined inwardly in advance of the cross piece 5 while the side member 4 has an abruptly inwardly offset portion 6. These side members terminate in parallel portions 7 at their front ends receiving between them the vertical hitch plate 8 which extends above and below the side members and is welded thereto as indicated at 9. This hitch plate has a vertical series of holes 10 adapted to receive the attaching bolts 11 of the tractor hitch coupling 12. The coupling 12 has spaced arms 13 with an opening 14 therein to receive the draw bolt 15 of the tractor drawbar 16 indicated by dotted lines in Fig. 1. The axle, cross piece, hitch plate coupling are rigidly connected so that when the carriage is connected to a tractor it is supported in upright position and stabilized by its attachment to the tractor.

The leg 17 is pivotally mounted at 18 on the under side of the side bars and is adapted to prevent objectionable tilting of the machine when it is disengaged from the tractor. It will be noted that the hitch is well to one side of the longitudinal center of the carriage.

A draw plate 19 is secured to the axle and cross piece and provided with holes 20 adapted to receive a clevis or other hitch device for attaching a truck or wagon so that it may be transported along with the mill.

The mill or grinder proper consists of a casing generally indicated by the numeral 21 and comprising a bottom section 22 and a top section 23. The bottom section is bolted to the flanges 24 and 25 respectively depending from the axle 1 and the cross piece 5 as best shown in Figs. 2 and 6. These flanges are welded to and constitute reinforcing members for the axle and the cross piece which is a desirable feature as these parts carry a relatively heavy load. The bottom section of the casing has horizontal angle iron side pieces 26 and 27 secured thereto and to which the flanges 28 and 29 on the top section 23 of the casing are secured. This top section 23 carries the discharge chamber 30 opening to the casing and delivers to the discharge pipe or conduit 31, the discharge pipe having a laterally directed portion 32 delivering to the dust extractor 33 which in turn has a discharge spout 34 rotatably supported to direct the discharge.

The upright 35 is supported by the socket 36 carried by the bottom section of the casing and is connected by the fixtures 37 and 38 to the discharge chamber and discharge pipe. The laterally projecting arm 39 on the upright supports the dust collector 33.

The rotor designated generally by the numeral 40 comprises a pair of side plates or members 41 and 42. The side plate or member 42 has openings 43 therein and cutter blades 44 at the rear edges of these openings. These blades coact with the shear bar 45 at the bottom of the feed opening 46 in the rear wall 47 of the casing. The rotor is provided with a plurality of sets of hammers 48. With the parts thus arranged the rotor coacts with the casing to provide a blower discharging through the opening 49 into the chamber 30. This chamber is provided with a door 50 hinged at 51 and provided with a latch 52.

The screen 53 is slidably supported in the ways 54 and may be inserted or removed through the door, the screen being shown in partially withdrawn position by dotted lines in Fig. 2 and the door being shown in open position. The concave 55 is conventional and it has a projecting part 56 which permits its being inserted and removed from its guide ways 57. The shaft 58 of the rotor is supported by bearings 59 carried by the cross bars 26 and 27. The shaft 58 is driven by the transmission comprising the pulley 60 connected by the belt 61 to the driving pulley 62. A housing 63 is provided for this belt transmission. The shaft 64 of the pulley is coupled to the driving shaft 65 which in turn is provided with a universal joint connection 66 to the power take-off shaft 67 of the tractor. A guard 68 is provided for the projecting end of the shaft 64.

The machine is designed to grind or mill various materials including unhusked corn and stalks. To facilitate feeding, the feed table or chute 69 is provided. When unhusked corn and stalks are fed to the grinder they are cut as they enter the casing through the opening 43 and are further ground or milled by means of the hammers coacting with the concave and the ground material is blown out through the screen into the discharge chamber and into a pipe to be delivered therefrom to a suitable receptacle as a wagon box or the like. The delivery spout 34 is desirably swingably mounted, the details of this mounting are not shown. When the machine is attached to a tractor it is stabilized and supported in upright position thereby and in proper relation to be driven from the power take-off of the tractor.

I have illustrated and described my invention in a highly practical commercial embodiment thereof. I have not attempted to illustrate or describe other embodiments or adaptations which I contemplate as it is believed that this disclosure will enable those skilled in the art to adapt or embody my invention as may be desired.

Having thus described my invention, what I claim as new and desire to secure by Letters Patent is:

1. In a portable mill, the combination with a grinder including a casing, and a rotor, said casing and rotor coacting to provide a blower for discharging the ground material, a carriage for said grinder comprising an axle, a pair of side bars, a cross bar extending between the side bars and in parallel relation to the axle, the side bars being extended forwardly beyond the cross bar, one of the side bars being inwardly inclined from the cross bar, the other being sharply inwardly offset, said side bars terminating in substantially parallel front end portions, a hitch plate disposed vertically between and fixedly secured to the front ends of said side bars and having a vertical series of holes therein, a drawbar coupling provided with a pair of bolts selectively engageable with pairs of said holes in said plate, the mill casing being disposed between said axle and cross bar and secured thereto, said casing comprising top and bottom portions, a horizontal supporting bar secured to the bottom section of the casing, said supporting bar having a socket thereon, an upright mounted in said socket, a discharge pipe for said mill connected to said upright, said discharge pipe having a laterally disposed delivery end, a collector to which said discharge pipe delivers, and a supporting arm for said dust collector carried by said upright.

2. In a portable mill, the combination with a grinder including a casing, and a rotor, said casing and rotor coacting to provide a blower for discharging the ground material, a carriage for said grinder comprising an axle, a pair of side bars, a cross bar extending between the side bars and in parallel relation to the axle, the side bars being extended forwardly beyond the cross bar and provided with a drawbar coupling, the mill casing being disposed between said axle and cross bar and secured thereto, said casing comprising top and bottom portions, a horizontal supporting bar secured to the bottom section of the casing, said supporting bar having a socket thereon, an upright mounted in said socket, a discharge pipe for said mill connected to said upright, said discharge pipe having a laterally disposed delivery end, a collector to which said discharge pipe delivers, and a supporting arm for said dust collector carried by said upright.

3. In a portable mill, the combination with a grinder including a casing, and a rotor, said casing and rotor coacting to provide a blower for discharging the ground material, a carriage for said grinder comprising an anxle, a pair of side bars, a cross bar extending between the side bars and in parallel relation to the axle, the side bars being extended forwardly beyond thec ross bar, one of the side bars being inwardly inclined from the cross bar, the other being sharply inwardly offset, said side bars terminating in substantially parallel front end portions, a hitch plate disposed between and fixedly secured to the front ends of said side bars and having a vertical series of holes therein, a drawbar coupling provided with a pair of bolts selectively engageable with pairs of said holes in said plate, the mill casing being disposed between said axle and cross bar and secured thereto, said cross bar supporting retaining said casing against forward movement relative to said axle.

4. In a portable mill, the combination with a grinder including a casing, and a rotor, said casing and rotor coacting to provide a blower for discharging the ground material, a carriage for said grinder comprising an axle, a pair of side bars, a cross bar extending between the side bars and in parallel relation to the axle, the side bars being extended forwardly beyond the cross bar, one of the side bars being inwardly inclined from the cross bar, the other being sharply inwardly offset, said side bar terminating in substantially parallel front end portions, a hitch means secured to the front ends of said side bars, the mill casing being disposed between said axle and cross bar and secured thereto and being bracingly supported by both the axle and cross bar.

5. In a portable mill, the combination with a grinder including a casing, and a rotor provided with a peripherally disposed series of hammers, said casing and rotor coacting to provide a blower for discharging the ground material, a carriage for said grinder comprising an axle, a pair of side bars, a cross bar extending between the side bars and in parallel relation to the axle, the side bars being extended forwardly beyond the cross bar and provided with a drawbar coupling, the mill casing being disposed between said axle and cross bar and secured thereto, said cross bar supportingly retaining said casing against forward movement relative to said axle, an upright carried by said carriage, and a discharge pipe for said mill connected to said upright.

6. In a hammer mill, the combination with a casing having a side feed opening therein and a discharge chamber at the top thereof terminating in a vertical discharge pipe, a rotor comprising side members, the side member adjacent the feed opening having a plurality of openings therein with cutter blades associated with the rear edges thereof, a shear bar coacting with said cutter blades carried by said casing, said rotor having a peripheral set of hammers and coacting with the casing to provide a blower discharging through the discharge chamber and discharge pipe, said casing having a peripheral discharge opening to said discharge chamber, said discharge chamber having a door, and a screen removably disposed across said discharge opening and removable through said door and a concave disposed in said casing opposite from said screen and having a handle member projecting exteriorly of the casing for the removal of the concave from the casing.

7. In a hammer mill, the combination with a casing having a side feed opening therein and a discharge chamber at the top thereof terminating in a vertical discharge pipe, a rotor, said rotor coacting with the casing to provide a blower discharging through the discharge chamber and discharge pipe, said casing having a peripheral discharge opening to said discharge chamber, said discharge chamber having a door, and a screen removably disposed across said discharge opening and removable through said door and a concave disposed in said casing opposite from said screen and having a handle member projecting exteriorly of the casing for the removal of the concave from the casing.

8. In a portable mill, the combination of a carriage comprising an axle provided with wheels, a pair of side members fixedly connected to said axle and extending forwardly therefrom, a cross piece extending between said side members and fixedly secured thereto in forwardly spaced parallel relation to the axle, one of said side members at the front of the cross piece being inwardly inclined, the other being abruptly offset inwardly, the side members terminating in parallel portions at their front ends, a vertically disposed hitch plate secured between the forward ends of the side members and having a vertical series of holes therein, a draw bar coupling member provided with a pair of bolts selectively engageable with the holes of said hitch plate and adapted to be secured to the draft bar of a tractor or the like, a hitch means for a trailing vehicle secured to said cross bar and axle and adapted to receive a coupling in substantial alignment with the said hitch connection of said side bars, a grinding mill comprising a casing disposed between said axle and cross piece and secured thereto.

9. In a portable mill, the combination of a carriage comprising an axle provided with wheels, a pair of side members fixedly connected to said axle and extending forwardly therefrom, a cross piece extending between said side members and fixedly secured thereto in forwardly spaced parallel relation to the axle, said side bars being provided with a hitch plate, a drawbar coupling member provided with a pair of bolts selectively engageable with the holes of said hitch plate and adapted to be secured to the draft bar of a tractor or the like, a grinding mill comprising a casing disposed between said axle and cross piece and secured thereto and having the front and rear walls thereof supportingly retained by said cross piece and axle respectively, driving connections for the rotor of said grinder comprising a transmission mounted on said casing and including a driving wheel positioned with its axis parallel with the path of travel of the carriage when propelled by a tractor, and a driving shaft connected thereto and adapted to be connected to the power take-off of the tractor.

JOHN A. ERICKSON.

REFERENCES CITED

The following references are of record in the file of this patent:

UNITED STATES PATENTS

| Number | Name | Date |
| --- | --- | --- |
| 179,646 | Denton | July 11, 1876 |
| 1,246,976 | Merwin | Nov. 20, 1917 |
| 1,886,537 | Evans | Nov. 8, 1932 |
| 1,985,888 | Day | Jan. 1, 1935 |
| 2,160,695 | Brannon | May 30, 1939 |
| 2,312,612 | Wetmore | Mar. 2, 1943 |
| 2,347,907 | Hill | May 2, 1944 |